Sept. 3, 1935. J. KALLOS 2,013,054
AUTOMATIC DEPOSITING DEVICE FOR MEAT AND SAUSAGE
SLICING MACHINES WITH ROTARY CIRCULAR KNIVES
Original Filed Dec. 4, 1930
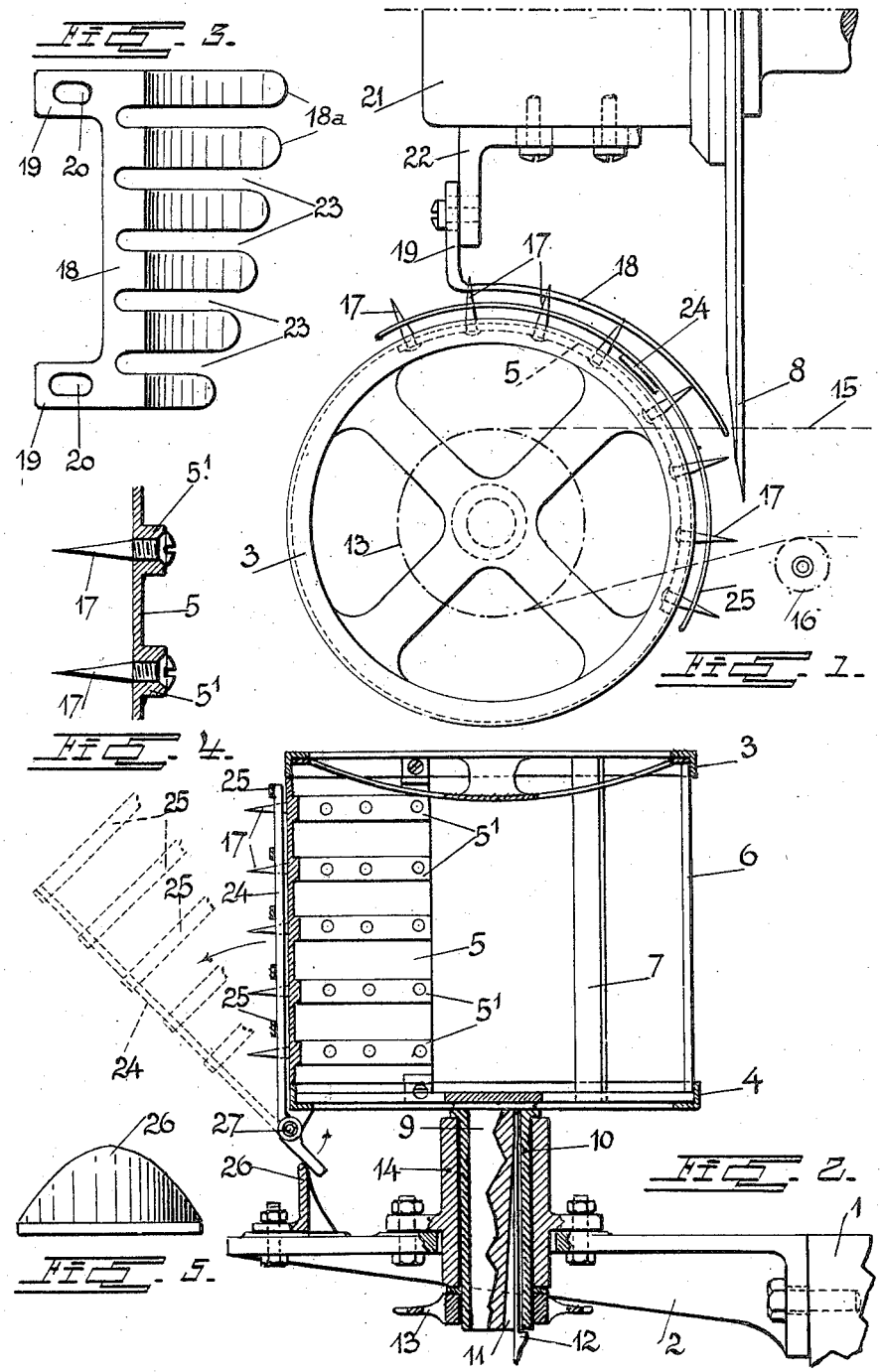

Patented Sept. 3, 1935

2,013,054

UNITED STATES PATENT OFFICE 2,013,054

AUTOMATIC DEPOSITING DEVICE FOR MEAT AND SAUSAGE SLICING MACHINES WITH ROTARY CIRCULAR KNIVES

Johann Kallos, Budapest, Hungary

Application December 4, 1930, Serial No. 500,039
Renewed December 5, 1934. In Hungary December 28, 1929

1 Claim. (Cl. 146—94)

Automatic depositing devices for meat and sausage slicing machines with rotary circular knives are already known in which the slices are gripped by points or needles of a rotary turning element and deposited by a scraper. This invention differs from such devices particularly in that on the preferably cylindrically shaped rotary element of the machine a comparatively very light depositing rake is hinged, the prongs of which rake bearing against the casing surface lie between gripper points and engage under the cut off slice pushed onto the points or needles by a guide comb arranged eccentrically as regards the rotary element, and an extension of which rake comes into contact with a stop adjustable in known manner during the further rotation of the rotary element, so that the rake is swung away from the cylindrical casing and deposits the slice lying thereon.

All the known arrangements, in which the depositing is effected in that one half of the rotary element carrying the slice receives an oscillating movement, are open to the objection that considerable mass effects have to be overcome. As compared therewith an extremely light depositing rake is, according to the invention, hinged to the rotary element, which rake can be swung outwards and inwards without requiring considerable force. A further important feature of the invention consists in the peculiar construction of the guide comb pushing the cut slice onto the needles, and also in the eccentric arrangement thereof, as regards the rotary element.

A form of construction of the automatic depositing device for machines, in which the meat to be cut is moved towards and away from the rotary knife is illustrated by way of example in the accompanying drawing in which:—

Fig. 1 shows in top plan view the depositing device with guide comb.

Fig. 2 shows in vertical longitudinal section the depositing cylinder with its driving mechanism.

Fig. 3 is a top plan view of the guide comb.

Fig. 4 shows in longitudinal section on an enlarged scale a portion of the cylinder casing equipped with pointed needles.

Fig. 5 is an elevation of the stop actuating the depositing device.

On a support 2 fixed on a machine frame 1 carrying the clamping table, reciprocated in known manner, a cylinder composed of upper and lower hoops 3 and 4 of angular cross section, the casing 5 with longitudinal bars 6, 7, is rotatably mounted in front of a rotary knife 8 (Fig. 1). Radially projecting points 17 are fixed in the casing 5.

The points are situated in a cylindrical plane preferably at a distance of 2 to 4 mms. from the plane of the knife edge so that the needle points cannot come into contact with the meat to be cut.

A guide comb 18 is arranged at the side of the rotary knife 8, adjustable and fixable in known manner.

The depositing device operates in the following manner:

The thin slice of meat or the like, cut by the rotary knife 8, is guided into the space between the casing 5 and the guide comb 18. As the cylindrical surface of the guide comb is arranged eccentrically as regards that of the cylinder (Fig. 1), the slice of meat cut off is pushed by the guide comb 18 onto the points 17 moving in the cam gaps 23 so that it is carried along by the points. It will be noted that the tines 18a of the guide comb 18 are of gradually decreasing lengths in a downward direction with the free ends of the tines concentric with the cutting edge of the blade 8 and lying in a vertical plane adjacent the blade. As the cutting blade is positioned to cut downwardly through the meat, the slice severed from the meat is first cut away at the upper end of the meat and the upper longer finger directs the initially cut portion of the slice onto the points 17. As the cutting of the meat slice progresses, the lower tines 18a of the guide comb successively receive the slice for moving the same further into engagement with the points 17.

Between the slice of meat and the casing 5 a scraper is arranged, consisting of prongs 25 fixed in parallel relation to each other on a two-armed lever 24 and bearing against the casing. This scraper is oscillated by a stop 26 adjustably fixed on the support 2, when the cylinder reaches a certain position and is turned into the position shown in dotted lines in Fig. 2 in such a manner that the meat slice is scraped off the points 17 and automatically deposited on the delivery table not shown in the drawing. By adjusting and fixing the stop 26 on the support 2 it is possible to effect at a certain point the depositing of the slice of meat carried along by the points 17 with the aid of the two-armed lever 24 attached to the cylinder by means of the hinge 27 and spring actuated in known manner and the prongs 25 mounted thereon.

In order to be able to easily remove the rotary element for the purpose of cleaning, it is provided with a longitudinally flattened journal 9 adapted to be inserted in a sleeve 10 and held by a spring catch 12 engaging under the edge of the sleeve 10 and arranged in a longitudinal groove 11 (Fig. 2).

The sleeve 10, on the lower end of which a sprocket wheel 13 is wedged, is rotatably mounted in the adjustable bearing bush 14 on the support 2. The sprocket wheel 13 is rotated by means of a chain 15 with the aid of suitable gear wheel transmission from the main shaft of the machine, and as for the necessary adjustment of the rotary element the bearing bush 14 must be adjustable on the support 2, a chain stretching wheel 16 is preferably provided in known manner (Fig. 1).

According to the form of construction shown in Fig. 4, the points 17 are fixed by being screwed from the inner side into reinforcement ribs 5' of the casing 5. By this means the points 17 are made easily exchangeable.

For the purpose of adjusting the guide comb 18 the stops 19, serving for fixing same, are provided with longitudinal slots 20. Similar slots are also provided in the angle 22 carrying the guide comb 18 and designed to be fixed to the machine frame 21.

Several forms of construction are possible within the scope of the invention and it is here pointed out that the subject matter of the invention can be utilized in any machines, in which the rotary knife is moved towards and away from the meat to be cut. In this instance it is only necessary to provide suitable driving means for the depositing device.

I claim:—

In an automatic depositing device for meat and sausage slicing machines the combination of a rotary knife, a vertically arranged rotary cylindrical element, gripper points on the circumference of said element adapted to grip the slices as they are cut by said rotary knife, a curved guide comb tapering vertically downward eccentric to said cylindrical rotary element forming therewith a gap narrowing toward its lower end having prongs extending over a portion of the circumference thereof between said points adapted to gradually and positively push the slice cut by said knife onto said gripper points, and means hingedly mounted on said rotary element adapted to remove the cut slice from said points and deposit the same, and means for actuating said last mentioned means.

JOHANN KALLOS.